(12) United States Patent
Jaiswal et al.

(10) Patent No.: US 11,233,936 B2
(45) Date of Patent: Jan. 25, 2022

(54) METHOD AND ELECTRONIC DEVICE FOR RECOMMENDING IMAGE CAPTURE MODE

(71) Applicant: Samsung Electronics Co., Ltd., Suwon-si (KR)

(72) Inventors: Swadha Jaiswal, Bengaluru (IN); Debayan Mukherjee, Bengaluru (IN); Mannu Amrit, Bengaluru (IN); Shivi Pal, Bengaluru (IN); Vibha Venkatesh Kulkarni, Bengaluru (IN); Pavan Sudheendra, Bengaluru (IN); Pankaj Kumar Bajpai, Bengaluru (IN); Balvinder Singh, Bengaluru (IN); Narasimha Gopalakrishna Pai, Bengaluru (IN); Sanjay Narasimha Murthy, Bengaluru (IN); Vineeth Thanikonda Munirathnam, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/517,373

(22) Filed: Jul. 19, 2019

(65) Prior Publication Data
US 2020/0045225 A1 Feb. 6, 2020

(30) Foreign Application Priority Data

Jul. 20, 2018 (IN) .............................. 201841027230
Jul. 18, 2019 (IN) .............................. 2018 41027230

(51) Int. Cl.
*H04N 5/232* (2006.01)
(52) U.S. Cl.
CPC ..... *H04N 5/23222* (2013.01); *H04N 5/23219* (2013.01); *H04N 5/23238* (2013.01); *H04N 5/23245* (2013.01); *H04N 5/232939* (2018.08)

(58) Field of Classification Search
CPC ......... H04N 5/23222; H04N 5/232939; H04N 5/23219; H04N 5/23238; H04N 5/23245
See application file for complete search history.

(56) References Cited

U.S. PATENT DOCUMENTS 9,225,947 B2 12/2015 Lee et al.
9,386,229 B2 7/2016 Chang et al.
(Continued)

FOREIGN PATENT DOCUMENTS

KR 10-2017-0020069 A 2/2017
KR 20170020069 A * 2/2017
(Continued)

OTHER PUBLICATIONS

International Search Report dated Oct. 23, 2019 in connection with International Patent Application No. PCT/KR2019/008990, 3 pages.
(Continued)

*Primary Examiner* — Hesham K Abouzahra

(57) ABSTRACT

Embodiments herein disclose a method for recommending an image capture mode by an electronic device. The method includes identifying, by the electronic device, at least one ROI displayed in a camera preview of the electronic device for capturing an image in a non-ultra-wide image capture mode. Further, the method includes determining, by the electronic device, that the at least one ROI is suitable to capture in an ultra-wide image capture mode. Further, the method includes providing, by the electronic device, at least one recommendation to switch to the ultra-wide image capture mode from the non-ultra-wide image capture mode for capturing the image.

18 Claims, 18 Drawing Sheets

(56) References Cited

U.S. PATENT DOCUMENTS

| | | | |
|---|---|---|---|
| 9,521,321 B1* | 12/2016 | Kozko | H04N 5/23216 |
| 9,667,860 B2 | 5/2017 | Hakim et al. | |
| 9,749,543 B2 | 8/2017 | Kim et al. | |
| 2012/0249726 A1* | 10/2012 | Corcoran | G06T 3/0062 |
| | | | 348/36 |
| 2016/0028949 A1 | 1/2016 | Lee et al. | |
| 2016/0381282 A1 | 12/2016 | Bandlamudi et al. | |
| 2017/0054897 A1 | 2/2017 | Shanmugam et al. | |
| 2017/0134643 A1* | 5/2017 | Kim | H04N 5/23219 |
| 2017/0285736 A1 | 10/2017 | Young et al. | |
| 2018/0137119 A1 | 5/2018 | Li et al. | |

FOREIGN PATENT DOCUMENTS

| | | | |
|---|---|---|---|
| KR | 10-2017-0090881 A | 8/2017 |
| KR | 10-1867051 B1 | 6/2018 |
| WO | 2016/013902 A1 | 1/2016 |

OTHER PUBLICATIONS

Supplementary European Search Report dated Mar. 30, 2021 in connection with European Application No. 19838480.2, 11 pages.
Liao, Hsien-Chou, et al., "Automatic Zooming Mechanism for Capturing Clear Moving Object Image Using High Definition Fixed Camera," ICACT Transactions on Advanced Communications Technology (TACT), vol. 5, Issue 4, Jul. 2016, 8 pages.
Office Action dated Jul. 1, 2021 in connection with India Patent Application No. 201841027230, 6 pages.

* cited by examiner

View changed
To UW

METHOD AND ELECTRONIC DEVICE FOR RECOMMENDING IMAGE CAPTURE MODE

CROSS-REFERENCE TO RELATED APPLICATIONS

This application is based on and claims priority under 35 U.S.C. § 119 to Indian Patent Provisional Application No. 201841027230, filed on Jul. 20, 2018, and Indian Patent Application No. 201841027230, filed on Jul. 18, 2019 in the Indian Intellectual Property Office, the disclosure of which is incorporated by reference herein in its entirety.

BACKGROUND

1. Field

The present disclosure relates to an image capturing system, and is more specifically related to a method for recommending an image capture mode by an electronic device.

2. Description of Related Art

In general, with scene understanding capabilities, user's naked eye cannot see or imagine the possible outputs that an intelligent camera along with an ultra-widen angles lens Field of View (FOV) would be able to provide. Currently, the camera has FOV clubbed with artificial intelligence (AI) provides plethora of opportunities to assist the user capture images that would not be possible otherwise.

The posture of holding the camera has a lot of impact on the taken picture. Each scene has its own set of rules which an ordinary camera user may not understand. For example, just taking a few steps towards a subject can give a better photo and the user may not understand this. Doing wide scene analysis and providing an indication/suggesting an action can help the user in getting a great capture.

Conventional systems identify a scene and understanding few filter/color/correction options is known. Further, the systems use intelligence and machine learning to suggest best possible composition of the current view is of existence. Further, the conventional systems perform low aperture captures and pick objects from physical world and converting them to virtual objects.

Thus, it is desired to address the above mentioned shortcomings or at least provide a useful alternative.

SUMMARY

Accordingly, the embodiments herein disclose a method for recommending an image capture mode by an electronic device. The method includes identifying, by the electronic device, at least one region of interest (ROI) displayed in a camera preview of the electronic device for capturing an image in a non-ultra-wide image capture mode. Further, the method includes determining, by the electronic device, that the at least one ROI is suitable to capture in an ultra-wide image capture mode. Further, the method includes providing, by the electronic device, at least one recommendation to switch to the ultra-wide image capture mode from the non-ultra-wide image capture mode for capturing the image.

In an embodiment, the at least one recommendation is provided in the camera preview of the electronic device.

In an embodiment, determining, by the electronic device, that the at least one ROI is suitable to capture in the ultra-wide image capture mode includes determining, by the electronic device, at least one object in the at least one ROI, determining, by the electronic device, whether the at least one object in the at least one ROI matches with at least one predefined object, and determining that the at least one ROI is suitable to capture in the ultra-wide image capture mode in response to determining that the at least one object in the at least one ROI matches with the at least one predefined object.

In an embodiment, further, the method includes providing, by the electronic device, a feedback to capture the image of the at least one ROI in the ultra-wide image capture mode. Further, the method includes activating, by the electronic device, the ultra-wide image capture mode. Further, the method includes generating, by the electronic device, the image of the at least one ROI in the ultra-wide image capture mode based on the feedback.

In an embodiment, generating, by the electronic device, the image of the at least one ROI in the ultra-wide image capture mode based on the feedback includes capturing, by the electronic device, scene data of the at least one ROI in the ultra-wide image capture mode, automatically modifying or correcting, by the electronic device at least one portion of the scene data corresponding to the at least one ROI based on the feedback, and generating, by the electronic device, the image based on the modified portions of the scene data corresponding to the at least one ROI or the correction portions of the scene data corresponding to the at least one ROI.

In an embodiment, the at least one recommendation is provided when a wide lens and a telephoto lens are activated.

In an embodiment, the suggestion to switch to the ultra-wide lens can be provided upon analysis of wide frame data and upon user selection based on suggestion, the ultra-wide lens is activated.

In an embodiment, the at least one ROI is automatically identified based on at least one of a presence of a person in the camera preview, and a direction of a gaze of a user towards at least one portion in the camera preview.

Accordingly, the embodiments herein disclose an electronic device for recommending an image capture mode. The electronic device includes a processor coupled with a memory. The processor is configured to identify at least one ROI displayed in a camera preview of the electronic device for capturing an image in a non-ultra-wide image capture mode. Further, the processor is configured to determine that the at least one ROI is suitable to capture in an ultra-wide image capture mode. Further, the processor is configured to provide at least one recommendation to switch to the ultra-wide image capture mode from the non-ultra-wide image capture mode for capturing the image.

Accordingly, the embodiments herein disclose a method for recommending an image capture mode by an electronic device. The method includes identifying, by the electronic device, at least one ROI displayed in a camera preview of the electronic device. Further, the method includes determining, by the electronic device, at least one image capture mode from a plurality of image capture modes based on the at least one ROI. Further, the method includes providing, by the electronic device, at least one recommendation to activate the at least one determined image capture mode from the plurality of image capture modes to capture an image.

In an embodiment, determining the at least one image capture mode from the plurality of image capture modes based on the at least one ROI includes: determining at least one object in the at least one ROI, determining that the at least one object in the at least one ROI matches with at least one predefined object, and determining the at least one image capture mode from the plurality of image capture modes based on determination.

In an embodiment, further the method includes providing a feedback to capture the image of the at least one ROI in the at least one determined image capture mode. Further, the method includes generating the image of the at least one ROI in the at least one determined image capture mode based on the feedback.

Accordingly, the embodiments herein disclose an electronic device for recommending an image capture mode. The electronic device includes a processor coupled with a memory. The processor is configured to identify at least one ROI displayed in a camera preview of the electronic device. Further, the processor is configured to determine at least one image capture mode from a plurality of image capture modes based on the at least one ROI. Further, the processor is configured to provide at least one recommendation to activate the at least one determined image capture mode from the plurality of image capture modes to capture an image These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This method and system is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
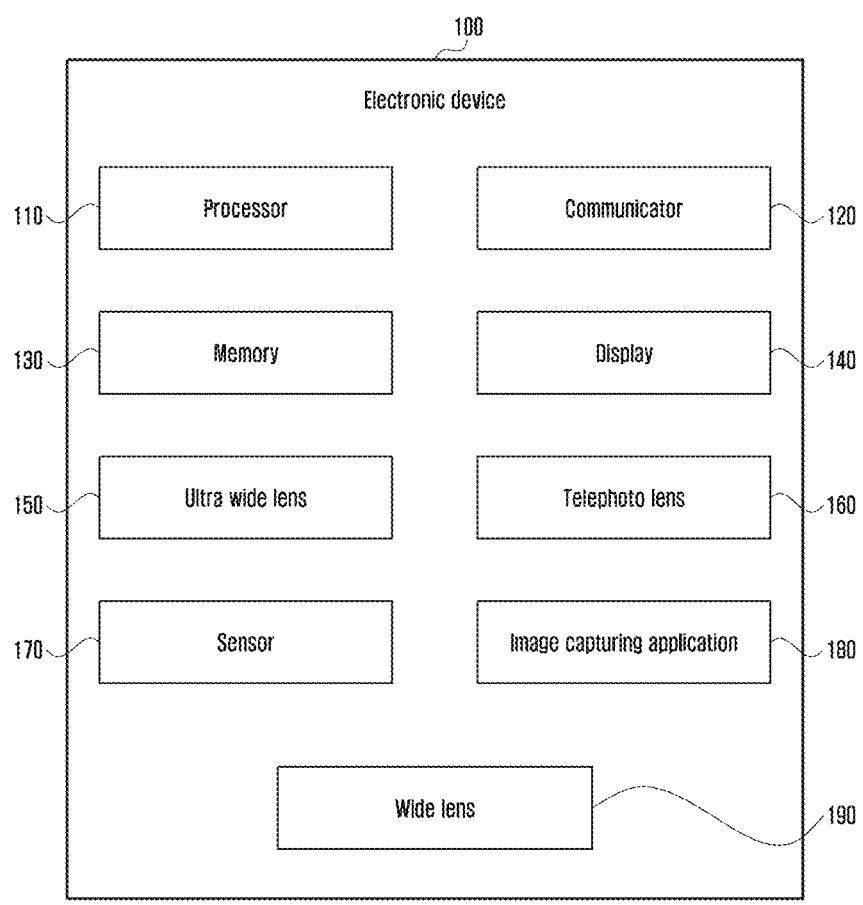
FIG. 1A illustrates various blocks of an electronic device for recommending an image capture mode, according to an embodiment as disclosed herein.

FIGS. 1A through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The principal object of the embodiments herein is to provide a method for recommending an image capture mode by an electronic device.

Another object of the embodiments herein is to identify at least one region of interest (ROI) displayed in a camera preview for capturing an image in a non-ultra-wide image capture mode.

Another object of the embodiments herein is to determine at least one object in the at least one ROI.

Another object of the embodiments herein is to determine whether the at least one object in the at least one ROI matches with at least one predefined object.

Another object of the embodiments herein is to determine that the at least one ROI is suitable to capture in the ultra-wide image capture mode in response to determining that the at least one object in the at least one ROI matches with the at least one predefined object.

Another object of the embodiments herein is to provide at least one recommendation to switch to the ultra-wide image capture mode from the non-ultra-wide image capture mode for capturing the image.

Another object of the embodiments herein is to provide a feedback to capture the image of the at least one ROI in the ultra-wide image capture mode.

Another object of the embodiments herein is to capture scene data of the at least one ROI in the ultra-wide image capture mode.

Another object of the embodiments herein is to automatically modify or correct at least one portion of the scene data corresponding to the at least one ROI based on the feedback.

Another object of the embodiments herein is to generate the image based on the modified portions of the scene data corresponding to the at least one ROI or the correction portions of the scene data corresponding to the at least one ROI.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provide a method for recommending an image capture mode by an electronic device. The method includes identifying, by the electronic device, at least one region of interest (ROI) displayed in a camera preview of the electronic device for capturing an image in a non-ultra-wide image capture mode. Further, the method includes determining, by the electronic device, that the at least one ROI is suitable to capture in an ultra-wide image capture mode. Further, the method includes providing, by the electronic device, at least one recommendation to switch to the ultra-wide image capture mode from the non-ultra-wide image capture mode for capturing the image.

The proposed method can be used to sense, analyze, understand a wider field of view and recreate a natural or artificial light from the ambience (physical world) into a current live experience for capturing a better image. The electronic device includes the ultra-wide lens for better scene understanding for sensing immense motion in the background to trigger a light painting nature of capture. The method can be used to understand the scene to provide intelligent capture suggestions.

The method can be used to provide best compositions for capturing photos by using the ultra-wide angle lens along with telephoto lens, wide lens clubbed with AI. The system provides effortless and auto triggered capturing suggestions for achieving signature aesthetics in photography using the ultra-wide lens and intelligence in a phone (best compositions).

The electronic device enable the user to capture a best possible shot even at the lack of resources like light (subject being dark) by borrowing and recreating actual ambient lighting for a natural looking output. The system uses the ultra-wide angle lens's field of view to ensure best composition due to more data availability. This improves the user's experience.

In general, each scene has its own set of rules which an ordinary camera user may not understand. In an example, just taking a few steps away from the subject can give a better photo, the user may not understand this. Based on the proposed methods, doing wide scene analysis and providing an indication/suggesting an action can help a user in getting a great capture based on photography rules.

Referring now to the drawings, and more particularly to FIGS. 1A through 8B, where similar reference characters denote corresponding features consistently throughout the figures, there are shown preferred embodiments.

FIG. 1A illustrates various blocks of an electronic device (100) for recommending an image capture mode, according to an embodiment as disclosed herein. The electronic device (100) can be, for example, but not limited to a cellular phone, a smart phone, a Personal Digital Assistant (PDA), a tablet computer, a laptop computer, a virtual reality device, a mixed reality device, an augmented reality device, a multi camera system, a smart watch, or the like.

In an embodiment, the electronic device (100) includes a processor (110), a communicator (120), a memory (130), a display (140), an ultra-wide lens (150), a telephoto lens (160), a sensor (170), an image capturing application (180), and a wide lens (190). The processor (110) is coupled with the communicator (120), the memory (130), the display (140), the ultra-wide lens (150), the telephoto lens (160), the sensor (170), the image capturing application (180) and the wide lens (190).

In an embodiment, the processor (110) is configured to identify at least one ROI displayed in a camera preview for capturing an image in a non-ultra-wide image capture mode. In an embodiment, the camera preview is shown on the image capturing application (180). In an embodiment, the least one ROI is automatically identified based on at least one of a presence of a user in the camera preview and a direction of a gaze of the user towards at least one portion in the camera preview. In an embodiment, the presence of the user in the camera preview and the direction of the gaze of the user towards at least one portion in the camera preview is identified using the sensor (170). After identifying the at least one ROI displayed in the camera preview for capturing the image in the non-ultra-wide image capture mode, the processor (110) is configured to determine that the at least one ROI is suitable to capture in an ultra-wide image capture mode.

In an embodiment, the processor (110) is configured to determine at least one object in the at least one ROI and determine whether the at least one object in the at least one ROI matches with at least one predefined object. The predefined object can be, for example, but not limited to a mountain, a sky, a snow, a sunset, a sunrise, a waterfall, a beach, a city, a waterside scenery, a stage, people or the like. Further, the processor (110) is configured to determine that the at least one ROI is suitable to capture in the ultra-wide image capture mode in response to determining that the at least one object in the at least one ROI matches with the at least one predefined object.

Based on the determination, the processor (110) is configured to provide at least one recommendation to switch to the ultra-wide image capture mode from the non-ultra-wide image capture mode for capturing the image. In an example, the electronic device (100) switches to the ultra-wide lens (150) from the telephoto lens (160) for capturing the image. In an embodiment, the at least one recommendation is provided in the camera preview. The at least one recommendation is provided when the wide lens (190) and the telephoto lens (160) are activated. In an embodiment, the suggestion to switch to the ultra-wide lens (150) can be provided upon analysis of wide frame data and upon user selection based on suggestion, the ultra-wide lens (150) is activated.

The ultra-wide lens (150) manipulates the view for better aesthetics and gaining perspective. The telephoto lens (160) is a type of camera lens designed for taking photographs of the user or object at moderate to far distances or the any distance. The wide lens (190) refers to a lens whose focal length is substantially smaller than a focal length of a normal lens for a given film plane. The ultra-wide lens (150) is a lens whose focal length is shorter than the short side of the sensor (170).

In another embodiment, the processor (110) is configured to identify the at least one ROI displayed in the camera preview. Further, the processor (110) is configured to determine at least one image capture mode from the plurality of image capture modes based on the at least one ROI. Further, the processor is configured to provide at least one recommendation to activate the at least one determined image capture mode from the plurality of image capture modes to capture the image. In an example, based on the at least one ROI, the electronic device (100) activates the ultra-wide lens (150) among the ultra-wide lens (150), the telephoto lens (160) and the wide lens (190) for capturing the image.

Further, the processor (110) is configured to provide a feedback to capture the image of the at least one ROI in the ultra-wide image capture mode. Further, the processor (110) is configured to activate the ultra-wide image capture mode. Further, the processor (110) is configured to generate the image of the at least one ROI in the ultra-wide image capture mode based on the feedback.

In an embodiment, the processor (110) is configured to capture scene data of the at least one ROI in the ultra-wide image capture mode. Further, the processor (110) is configured to automatically modify or correct at least one portion of the scene data corresponding to the at least one ROI based on the feedback. Further, the processor (110) is configured to generate the image based on the modified portions of the scene data corresponding to the at least one ROI or the correction portions of the scene data corresponding to the at least one ROI.

Further, the communicator (120) is configured for communicating internally between internal hardware components and with external devices via one or more networks. The memory (130) stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Various examples of the electronic device (100) configured to recommending the image capture mode is explained in the FIG. 3A to FIG. 8B.

Although the FIG. 1A shows various hardware components of the electronic device (100) but it is to be understood that other embodiments are not limited thereon. In other embodiments, the electronic device (100) may include less or more number of components. Further, the labels or names of the components are used only for illustrative purpose and does not limit the scope of the disclosure. One or more components can be combined together to perform same or substantially similar function to recommend the image capture mode in the electronic device (100).

Figure 1B:
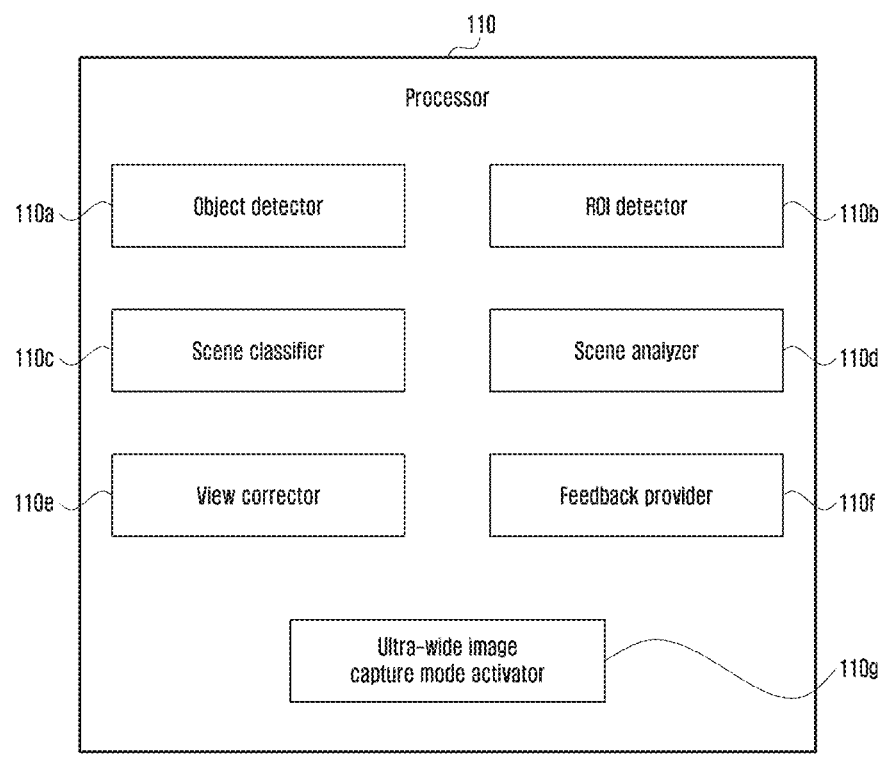
FIG. 1B illustrates various blocks of a processor, according to an embodiment as disclosed herein.

FIG. 1B illustrates various blocks of the processor (110), according to an embodiment as disclosed herein. In an embodiment, the processor (110) includes an object detector (110a), a ROI detector (110b), a scene classifier (110c), a scene analyzer (110d), a view corrector (110e), a feedback provider (110f) and an ultra-wide image capture mode activator (110g).

In an embodiment, the ROI detector (110b) is configured to identify the at least one ROI displayed in the camera preview for capturing the image in the non-ultra-wide image capture mode. After identifying the at least one ROI displayed in the camera preview for capturing the image in the non-ultra-wide image capture mode, the scene classifier (110c) and the scene analyzer (110d) are configured to determine that the at least one ROI is suitable to capture in the ultra-wide image capture mode.

In an embodiment, the object detector (110a) is configured to determine the at least one object in the at least one ROI and the view corrector (110e) determines whether the at least one object in the at least one ROI matches with at least one predefined object. Further, the scene classifier (110c) and the scene analyzer (110d) are configured to determine that the at least one ROI is suitable to capture in the ultra-wide image capture mode in response to determining that the at least one object in the at least one ROI matches with the at least one predefined object.

Based on the determination, the ultra-wide image capture mode activator (110g) is configured to provide at least one recommendation to switch to the ultra-wide image capture mode from the non-ultra-wide image capture mode for capturing the image.

Further, the feedback provider (110f) is configured to provide the feedback to capture the image of the at least one ROI in the ultra-wide image capture mode. Further, the ultra-wide image capture mode activator (110g) is configured to activate the ultra-wide image capture mode. Further, the ultra-wide image capture mode activator (110g) is configured to generate the image of the at least one ROI in the ultra-wide image capture mode based on the feedback.

Although the FIG. 1B shows various hardware components of the processor (110) but it is to be understood that other embodiments are not limited thereon. In other embodiments, the processor (110) may include less or more number of components. Further, the labels or names of the components are used only for illustrative purpose and does not limit the scope of the disclosure. One or more components can be combined together to perform same or substantially similar function to recommend the image capture mode in the electronic device (100).

Figure 2A:
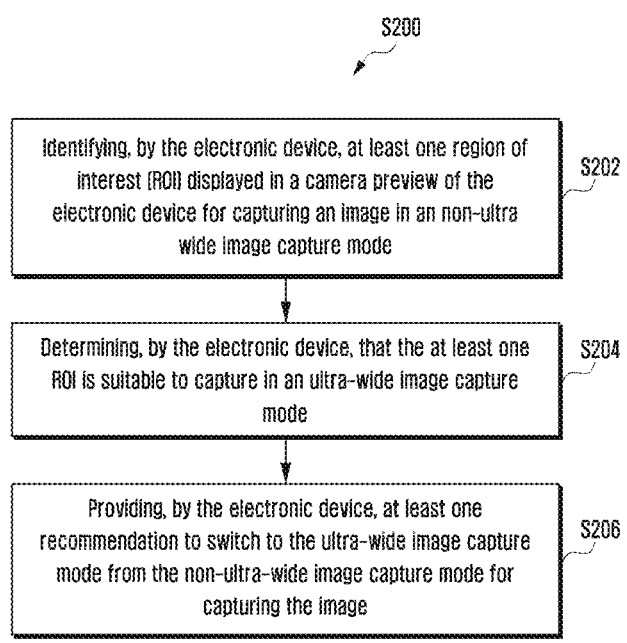
FIG. 2A illustrates a flow chart for recommending the image capture mode, according to an embodiment as disclosed herein.

FIG. 2A illustrates a flow chart (S200) for recommending the image capture mode, according to an embodiment as disclosed herein. The operations (S202-S206) are performed by the processor (110).

At S202, the method includes identifying the at least one ROI displayed in the camera preview of the electronic device (100) for capturing the image in the non-ultra-wide image capture mode. At S204, the method includes determining that the at least one ROI is suitable to capture in the ultra-wide image capture mode. At S206, the method includes providing at least one recommendation to switch to the ultra-wide image capture mode from the non-ultra-wide image capture mode for capturing the image.

Figure 2B:
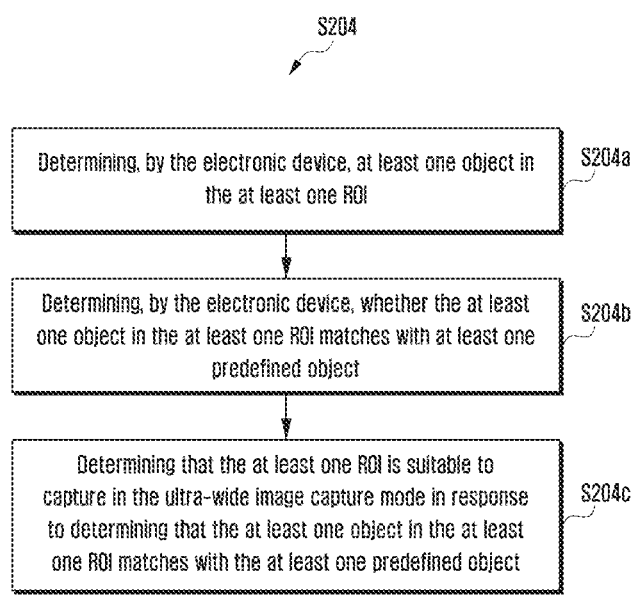
FIG. 2B illustrates a flow chart for determining that at least one ROI is suitable to capture in an ultra-wide image capture mode, according to an embodiment as disclosed herein.

FIG. 2B illustrates a flow chart (S204) for determining that the at least one ROI is suitable to capture in the ultra-wide image capture mode, according to an embodiment as disclosed herein. The operations (S204a-S204c) are performed by the processor (110).

At S204a, the method includes determining the at least one object in the at least one ROI. At S204b, the method includes determining whether the at least one object in the at least one ROI matches with the at least one predefined object. At S204c, the method includes determining that the at least one ROI is suitable to capture in the ultra-wide image capture mode in response to determining that the at least one object in the at least one ROI matches with the at least one predefined object.

Figure 2C:
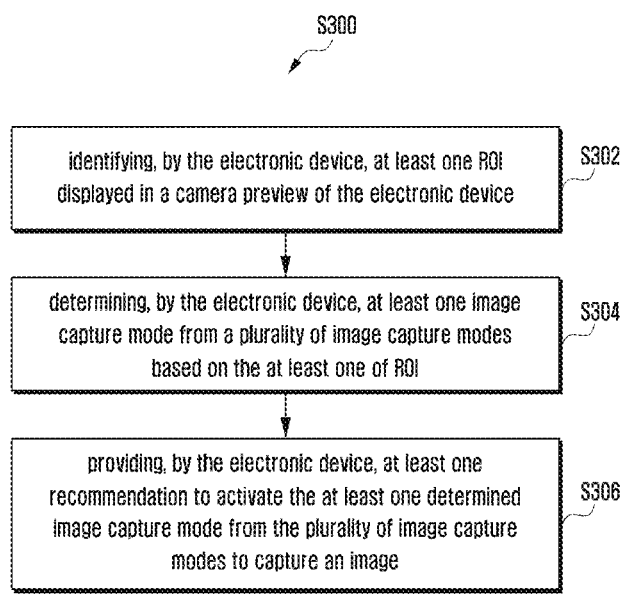
FIG. 2C illustrates a flow chart for recommending the image capture mode, according to an embodiment as disclosed herein; and FIG. 3A

FIG. 2C illustrates a flow chart (S300) for recommending the image capture mode, according to an embodiment as disclosed herein. The operations (S302-S306) are performed by the processor (110). At S302, the method includes identifying the at least one ROI displayed in the camera preview. At S302, the method includes determining the at least one image capture mode from the plurality of image capture modes based on the at least one ROI. At S306, the method includes providing at least one recommendation to activate the at least one determined image capture mode from the plurality of image capture modes to capture an image.

In an embodiment, determining the at least one image capture mode from the plurality of image capture modes based on the at least one ROI includes: determining at least one object in the at least one ROI, determining that the at least one object in the at least one ROI matches with at least one predefined object, and determining the at least one image capture mode from the plurality of image capture modes based on determination.

The various actions, acts, blocks, steps, or the like in the flow charts (S200, S204, and S300) may be performed in the order presented, in a different order or simultaneously. Further, in some embodiments, some of the actions, acts, blocks, steps, or the like may be omitted, added, modified, skipped, or the like without departing from the scope of the disclosure.

FIG. 3A-FIG. 8B illustrates example scenarios in which the electronic device (100) recommends the image capture mode, according to embodiments as disclosed herein.

Figure 3A:
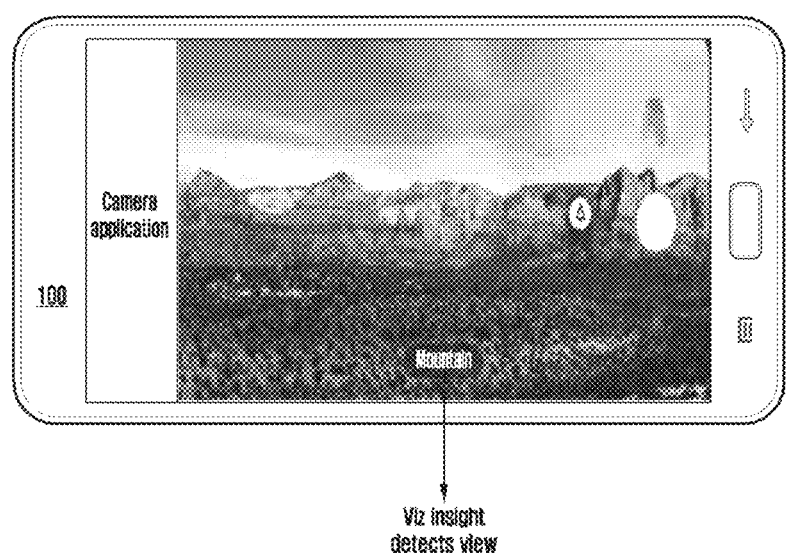
Figure 3B:
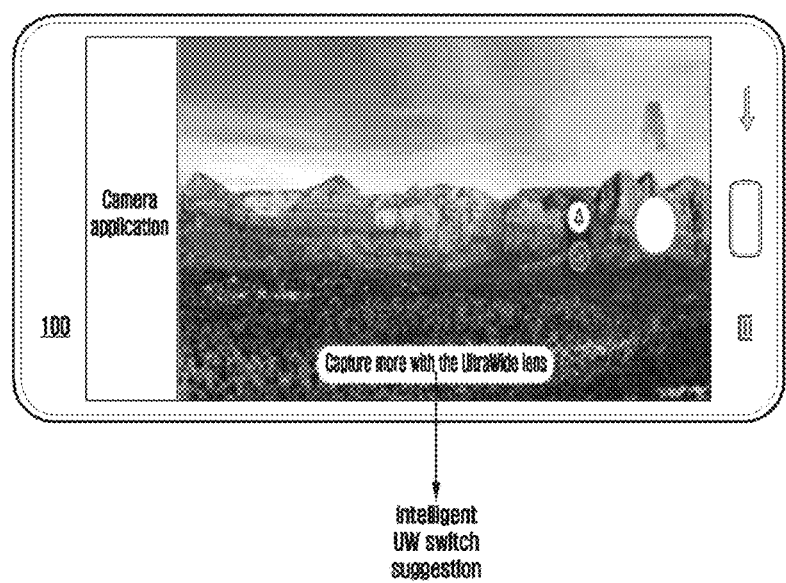
Figure 3C:
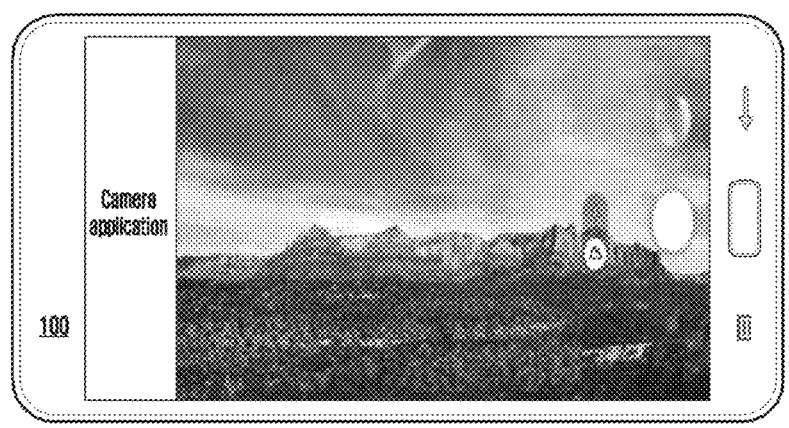

As shown in the FIG. 3A, the electronic device (100) identifies the mountain present in the camera preview in the current image capture mode. As shown in the FIG. 3B, the electronic device (100) compares the identified mountain in the current image capture mode with that of a repository of pre-defined mountain objects, where the predefined objects are suitable for capturing in the ultra-wide image capture mode. As shown in the FIG. 3C, based on the comparison, the electronic device (100) provides a recommending in the preview, to switch to the ultra-wide image capture mode if the mountain in the current image capture mode match with that of the pre-defined mountain objects in the repository.

Figure 4A:
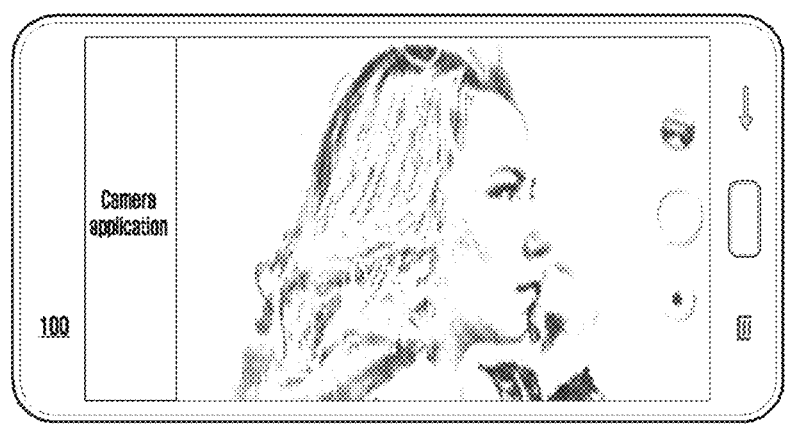
Figure 4B:
Figure 5A:
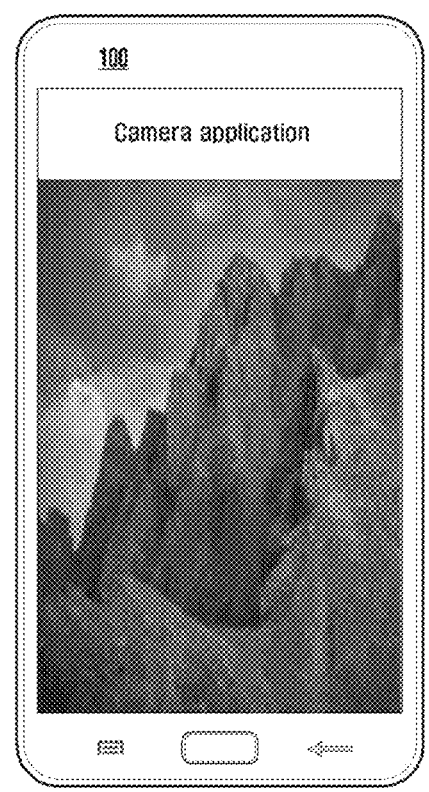
Figure 5B:
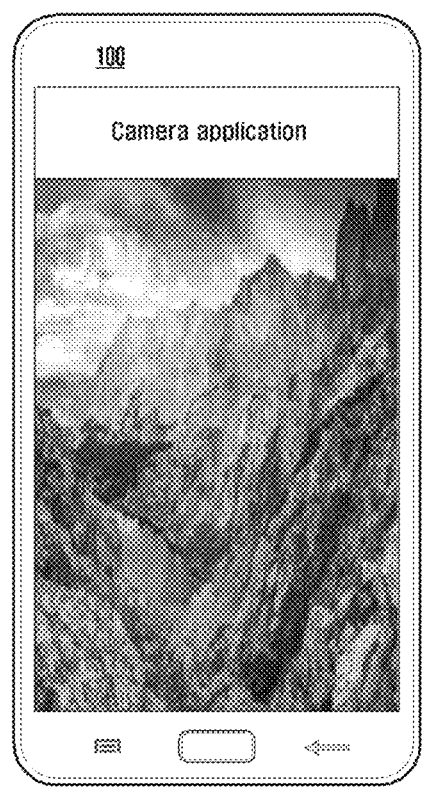

As shown in the FIG. 4A and FIG. 4B, the electronic device (100) identifies the ROI displayed in the camera preview for capturing the image in the non-ultra-wide image capture mode. The electronic device (100) identifies the user eye gaze direction and suggest the ultra-wide lens (150) (i.e., switch to the ultra-wide image capture mode from the non-ultra-wide image capture mode for capturing the image) to leave space in front of the user. The ultra-wide lens (150) manipulates the view for better aesthetics As shown in the FIG. 5A and FIG. 5B, the electronic device (100) identifies the at least one ROI displayed in the camera preview for capturing the mountain image in the non-ultra-wide image capture mode. Further, the electronic device (100) determines that the at least one ROI is suitable to capture in the ultra-wide image capture mode. Further, the electronic device (100) provides the recommendation (i.e., select ultra-wide lens (150) for interesting landscape) to switch to the ultra-wide image capture mode from the non-ultra-wide image capture mode for capturing the mountain image.

Figure 6A:
Figure 6B:
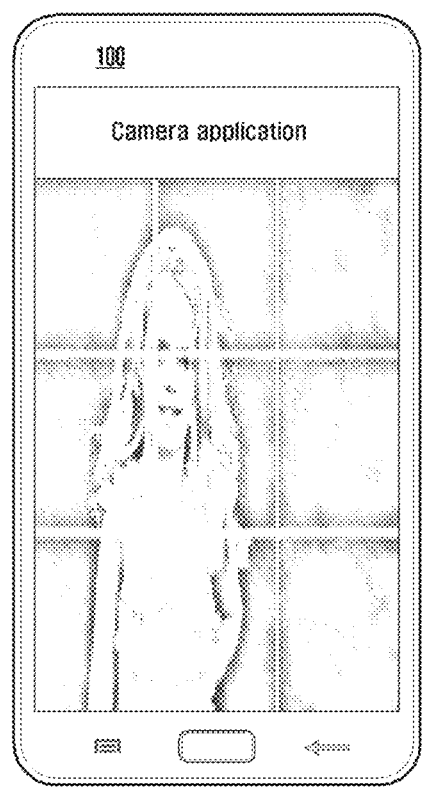

As shown in the FIG. 6A and FIG. 6B, the electronic device (100) identifies the at least one ROI displayed in the camera preview for capturing the child in the non-ultra-wide image capture mode. Further, the electronic device (100) determines that the at least one ROI is suitable to capture in the ultra-wide image capture mode using the eye direction of the child. Further, the electronic device (100) provides the recommendation (i.e., select the ultra-wide lens (150) and apply cropping to ensure eye position of user) to switch to the ultra-wide image capture mode from the non-ultra-wide image capture mode for capturing the child image.

Figure 7A:
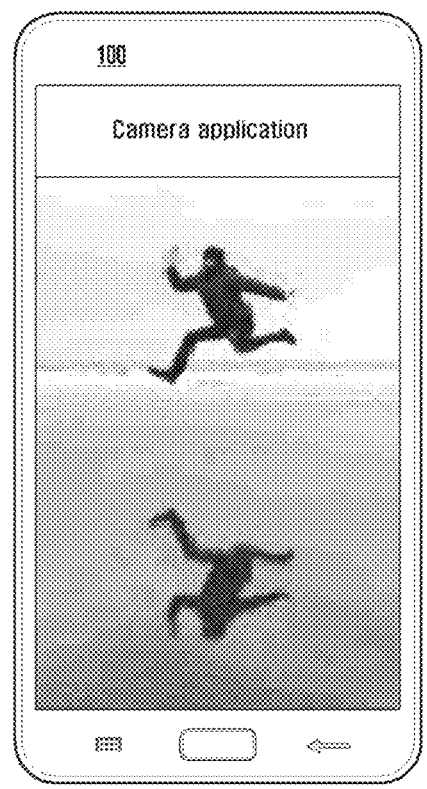
Figure 7B:
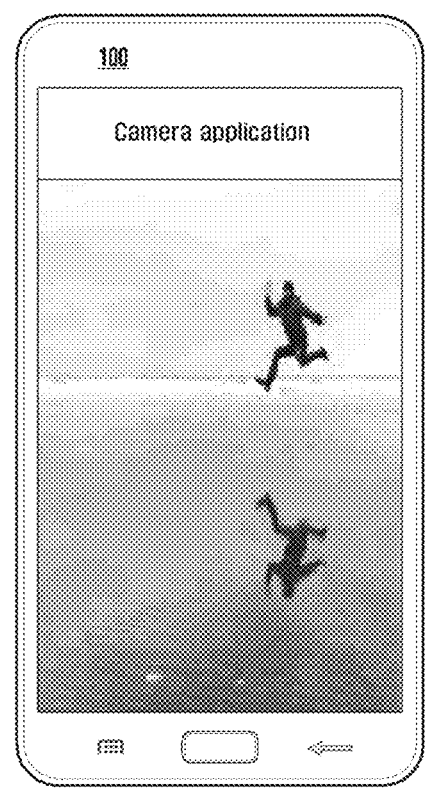

As shown in the FIG. 7A and FIG. 7B, the electronic device (100) identifies at least one ROI displayed in the camera preview for capturing the subject in the non-ultra-wide image capture mode. Further, the electronic device (100) determines that the at least one ROI is suitable to capture in the ultra-wide image capture mode. Further, the electronic device (100) provides the recommendation (i.e., identify subject movement direction, select the ultra-wide lens (150) and appropriate crop to leave space for movement) to switch to the ultra-wide image capture mode from the non-ultra-wide image capture mode for capturing the subject.

Figure 8A:
-FIG. 8B illustrates example scenarios in which the electronic device recommends the image capture mode, according to embodiments as disclosed herein.
Figure 8B:

As shown in the FIG. 8A and FIG. 8B, the electronic device (100) identifies the at least one ROI displayed in the camera preview for capturing the subject in the non-ultra-wide image capture mode. Further, the electronic device (100) determines that the at least one ROI is suitable to capture in the ultra-wide image capture mode based on the subject's head direction. Further, the electronic device (100) provides the recommendation (i.e., select ultra-wide lens (150) and appropriate crop to leave enough space above the subject's head) to switch to the ultra-wide image capture mode from the non-ultra-wide image capture mode for capturing the subject.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for recommending an image capture mode by an electronic device, comprising:
    identifying, by the electronic device, at least one region of interest (ROI) displayed in a camera preview of the electronic device for capturing an image in a non-ultra-wide image capture mode;
    determining, by the electronic device, based on a characteristic of the at least one ROI and based on whether a motion in a background of the at least one ROI is sensed, that the at least one ROI is suitable to capture in an ultra-wide image capture mode;
    providing, by the electronic device, at least one recommendation to switch to the ultra-wide image capture mode from the non-ultra-wide image capture mode for capturing the image;
    providing, by the electronic device, a feedback to capture the image of the at least one ROI in the ultra-wide image capture mode; and
    generating, by the electronic device, the image of the at least one ROI in the ultra-wide image capture mode based on the feedback,
    wherein the ultra-wide image capture mode is to capture the image using an ultra-wide lens.

2. The method of claim 1, wherein the at least one recommendation is provided in the camera preview of the electronic device.

3. The method of claim 1, wherein determining, by the electronic device, based on the characteristic of the at least one ROI, that the at least one ROI is suitable to capture in the ultra-wide image capture mode comprises:
    determining, by the electronic device, at least one object in the at least one ROI;
    determining, by the electronic device, whether the at least one object in the at least one ROI matches with at least one predefined object; and
    determining, by the electronic device, that the at least one ROI is suitable to capture in the ultra-wide image capture mode in response to determining that the at least one object in the at least one ROI matches with the at least one predefined object.

4. The method of claim 1, further comprising:
    activating, by the electronic device, the ultra-wide image capture mode.

5. An electronic device for recommending an image capture mode, comprising:
    a memory; and
    a processor, coupled with the memory, configured to:
        identify at least one region of interest (ROI) displayed in a camera preview of the electronic device for capturing an image in an non-ultra-wide image capture mode;
        determine, based on a characteristic of the at least one ROI and based on whether a motion in a background of the at least one ROI is sensed, that the at least one ROI is suitable to capture in an ultra-wide image capture mode;
    provide at least one recommendation to switch to the ultra-wide image capture mode from the non-ultra-wide image capture mode for capturing the image;
    provide a feedback to capture the image of the at least one ROI in the ultra-wide image capture mode; and
    generate the image of the at least one ROI in the ultra-wide image capture mode based on the feedback,
        wherein the ultra-wide image capture mode is to capture the image using an ultra-wide lens.

6. The electronic device of claim 5, wherein the at least one recommendation is provided in the camera preview of the electronic device.

7. The electronic device of claim 5, wherein to determine, based on the characteristic of the at least one ROI, that the at least one ROI is suitable to capture in the ultra-wide image capture mode the processor is configured to:
    determine at least one object in the at least one ROI;
    determine whether the at least one object in the at least one ROI matches with at least one predefined object; and
    determine that the at least one ROI is suitable to capture in the ultra-wide image capture mode in response to determining that the at least one object in the at least one ROI matches with the at least one predefined object.

8. The electronic device of claim 5, wherein the processor is further configured to:
    activate the ultra-wide image capture mode.

9. The electronic device of claim 8, wherein to generate the image of the at least one ROI in the ultra-wide image capture mode based on the feedback, the processor is configured to:
    capture scene data of the at least one ROI in the ultra-wide image capture mode;
    modify or correct at least one portion of the scene data corresponding to the at least one ROI based on the feedback; and
    generate the image based on the at least one portion of the scene data corresponding to the at least one ROI that is modified or the at least one portion of the scene data corresponding to the at least one ROI that is corrected.

10. The electronic device of claim 5, wherein to identify the at least one ROI the processor is configured to:
    detect at least one of a presence of a user in the camera preview or a direction of a gaze of the user towards at least one portion in the camera preview.

11. A method for recommending an image capture mode by an electronic device, comprising:
  identifying, by the electronic device, at least one region of interest (ROI) displayed in a camera preview of the electronic device;
  determining, by the electronic device, at least one image capture mode from a plurality of image capture modes based on a characteristic of the at least one ROI and based on whether a motion in a background of the at least one ROI is sensed;
  providing, by the electronic device, at least one recommendation to activate the at least one image capture mode from the plurality of image capture modes to capture an image;
  providing, by the electronic device, a feedback to capture the image of the at least one ROI in the at least one image capture mode; and
  generating, by the electronic device, the image of the at least one ROI in the at least one image capture mode based on the feedback,
  wherein the at least one image capture mode is an ultra-wide image capture mode using an ultra-wide lens.

12. The method of claim 11, wherein the at least one recommendation is provided in the camera preview of the electronic device.

13. The method of claim 11, wherein determining, by the electronic device, the at least one image capture mode from the plurality of image capture modes based on a characteristic of the at least one ROI comprises:
  determining, by the electronic device, at least one object in the at least one ROI;
  determining, by the electronic device, that the at least one object in the at least one ROI matches with at least one predefined object; and
  determining, by the electronic device, the at least one image capture mode from the plurality of image capture modes based on determining that the at least one object matches the at least one predefined object.

14. An electronic device for recommending an image capture mode, comprising:
  a memory; and
  a processor, coupled with the memory, configured to:
    identify at least one region of interest (ROI) displayed in a camera preview of the electronic device;
    determine at least one image capture mode from a plurality of image capture modes based on a characteristic of the at least one ROI and based on whether a motion in a background of the at least one ROI is sensed;
    provide at least one recommendation to activate the at least one image capture mode from the plurality of image capture modes to capture an image;
    provide a feedback to capture the image of the at least one ROI in the at least one image capture mode; and
    generate the image of the at least one ROI in the at least one image capture mode based on the feedback,
  wherein the at least one image capture mode is an ultra-wide image capture mode using an ultra-wide lens.

15. The electronic device of claim 14, wherein the at least one recommendation is provided in the camera preview of the electronic device.

16. The electronic device of claim 14, wherein to determine the at least one image capture mode from the plurality of image capture modes based on a characteristic of the at least one ROI the processor is configured to:
  determine at least one object in the at least one ROI;
  determine that the at least one object in the at least one ROI matches with at least one predefined object; and
  determine the at least one image capture mode from the plurality of image capture modes based on determining that the at least one object matches the at least one predefined object.

17. The electronic device of claim 14, wherein to generate the image of the at least one ROI in the at least one image capture mode based on the feedback, the processor is configured to:
  capture scene data of the at least one ROI in the at least one image capture mode;
  modify or correct at least one portion of the scene data corresponding to the at least one ROI based on the feedback; and
  generate the image based on the at least one portion of the scene data corresponding to the at least one ROI that is modified or the at least on portion of the scene data corresponding to the at least one ROI that is corrected.

18. The electronic device of claim 14, wherein to identify the at least one ROI the processor is configured to:
  detect at least one a presence of a user in the camera preview or a direction of a gaze of the user towards at least one portion in the camera preview.

* * * * *